United States Patent [19]

Borin

[11] Patent Number: 4,604,835
[45] Date of Patent: Aug. 12, 1986

[54] APPARATUS FOR AUTOMATIC MAINTENANCE OF SURFACE SPEED AND WORK-BEARING FORCE FOR ROTARY TOOL APPARATUS

[76] Inventor: Charles Borin, 19328 Halstead St., Northridge, Calif. 91324

[21] Appl. No.: 649,759

[22] Filed: Sep. 12, 1984

[51] Int. Cl.⁴ .............................................. B24B 49/16
[52] U.S. Cl. .................... 51/165.87; 51/74 R; 51/134.5 R; 51/165.92
[58] Field of Search ........... 51/165.92, 165.78, 165.79, 51/134.5 R, 165.71, 74 R

[56] References Cited

U.S. PATENT DOCUMENTS

| | | | |
|---|---|---|---|
| 1,694,340 | 12/1928 | Weinland | 51/134.5 R |
| 2,896,377 | 7/1959 | Walking | 51/134.5 R |
| 3,157,006 | 11/1964 | Belhen | 51/134.5 R |
| 3,948,001 | 4/1976 | Miyazawa | 51/137 |
| 3,962,831 | 6/1976 | Miki | 51/134.5 R |
| 4,020,598 | 5/1977 | Harmant | 51/134.5 R |
| 4,097,787 | 6/1978 | Larsson | 51/134.5 R |
| 4,478,009 | 10/1984 | Rukavina | 51/165.92 |

FOREIGN PATENT DOCUMENTS

| | | | |
|---|---|---|---|
| 2044083 | 3/1972 | Fed. Rep. of Germany | 51/165.92 |
| 479074 | 1/1938 | United Kingdom | 51/134.5 R |
| 798714 | 1/1981 | U.S.S.R. | 51/165.71 |

Primary Examiner—Harold D. Whitehead
Attorney, Agent, or Firm—Allan M. Shapiro

[57] ABSTRACT

The wear of a rotary finishing wheel operating against a continuously advancing work piece causes reduction in force of the wheel against the work piece. Wheel drive motor current is measured and the wheel is advanced toward the work piece to maintain substantially constant current. Wear of the rotary finishing wheel also reduces the surface speed of the wheel on the work piece. The wheel radius is measured and the wheel shaft speed is increased to maintain substantially constant surface speed. Such apparatus is suitable both for vertical and horizontal adjustment of the rotary finishing wheel with respect to a continuously horizontally advanced work piece.

18 Claims, 10 Drawing Figures

APPARATUS FOR AUTOMATIC MAINTENANCE OF SURFACE SPEED AND WORK-BEARING FORCE FOR ROTARY TOOL APPARATUS

BACKGROUND OF THE INVENTION

This invention is directed to an apparatus for automatically maintaining the circumferential cutting speed or surface speed of a rotary finishing wheel with respect to a work piece and for maintaining the work bearing force of the wheel with respect to the work piece so that proper cutting conditions are maintained over the life of a rotary finishing wheel which wears during use.

In a particular example of machines in which this invention is useful, it is noted that in many modern-day automatic and semi-automatic cutting machines, the cutting wheel wears during use. Such is experienced in wood-working finishing operations. In some fine woodworking operations, strips of wood are shaped to cross section and then are finished to remove the shaper cutting marks. Finishing is accomplished by the use of a rotary finishing wheel which acts on a wood strip guided therepast to polish the wood surface to give fine finish. The wheel is mounted in position with respect to the guides which control the passage of the shaped wood strips. As the rotary finishing wheel wears, the reduced diameter results in a lower surface cutting speed to decrease cutting efficiency and quality of finish. Machine adjustment must be made in these circumstances to maintain proper cutting conditions.

SUMMARY OF THE INVENTION

In order to aid in the understanding of this invention, it can be stated in essentially summary form that it is directed to an apparatus for the automatic maintenance of surface cutting speed of a rotary cutting wheel wherein conditions signal the wheel radius and cause adjustment of wheel rotary speed to maintain substantially constant surface cutting speed.

It is an object and advantage of this invention to provide an apparatus for the automatic maintenance of the surface speed of a rotary wheel to maintain cutting speed with respect to a work piece by sensing the position of the rotary wheel with respect to the work piece and adjusting the shaft speed of the rotary wheel to maintain a substantially constant surface cutting speed of the wheel with respect to the work piece.

It is another purpose and advantage of this invention to provide an apparatus for the automatic maintenance of work-bearing force of a rotary wheel upon a relatively advancing work piece by measuring the wheel-driving motor load and adjusting the position of the wheel with respect to the work piece to maintain motor load in a predetermined range so that work-bearing force is maintained.

It is a further purpose and advantage of this invention to provide an apparatus for the polishing of shaped wood moldings by feeding them continuously past a rotary finishing wheel and maintaining proper polishing conditions by adjustment of the wheel positioned with respect to the molding strips and adjusting the wheel rotational speed so that fast and efficient polishing of the wood molding strips is achieved over a substantial wear of the rotary finishing and polishing wheel.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 4 is an enlarged section taken generally along the line 4—4 of FIG. 1.

DESCRIPTION OF THE PREFERRED EMBODIMENTS

Figures 1, 2, 10:
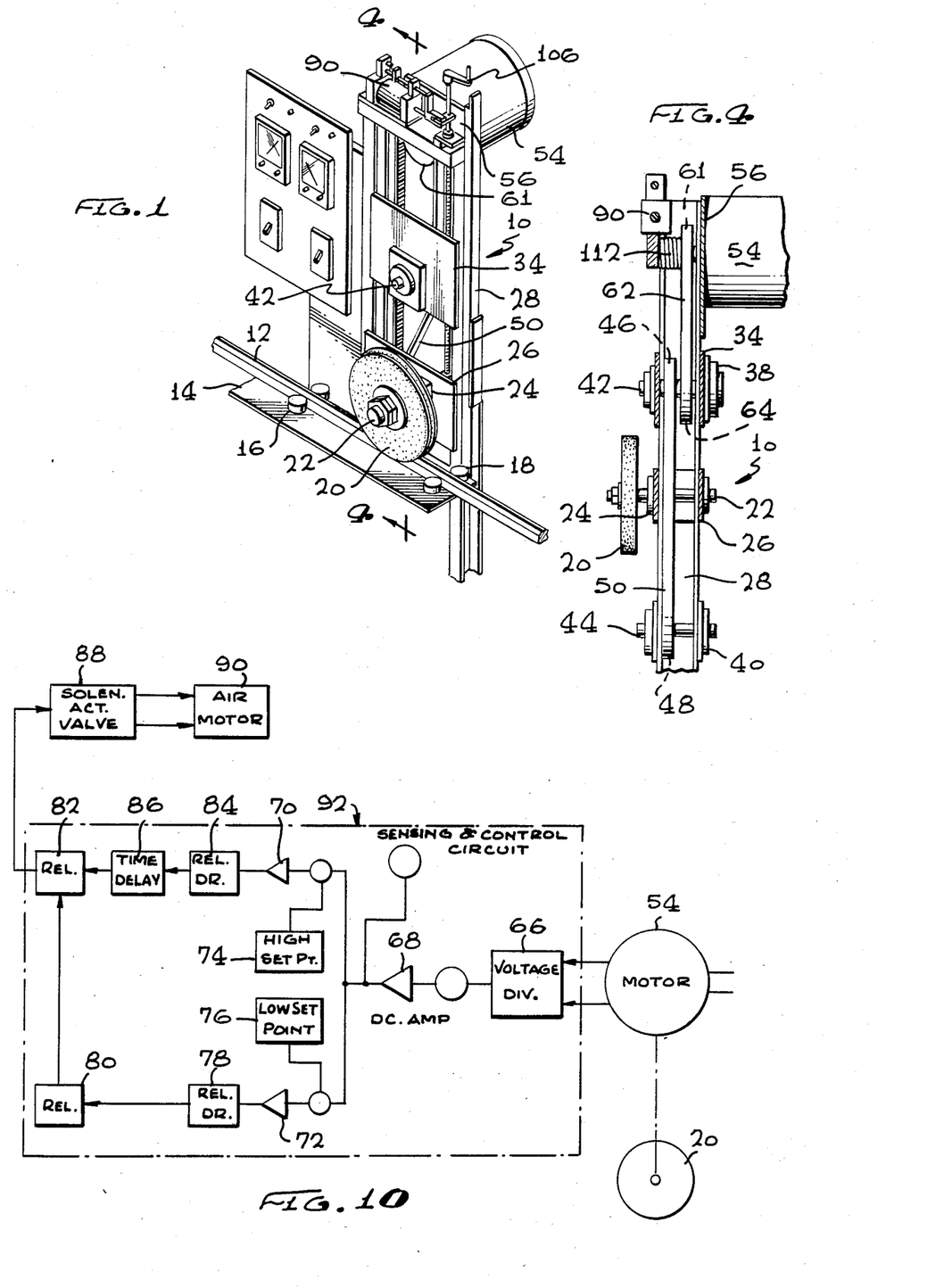
FIG. 1 is an isometric view from the front of the apparatus for automatic maintenance of surface speed and work-bearing force for a rotary tool in accordance with this invention.
FIG. 2 is an enlarged isometric rear elevational view thereof, with parts broken away.
FIG. 10 is a schematic electrical diagram showing the circuit by which the motor current is sensed and the position of the rotary abrasive wheel is adjusted.
Figure 2:
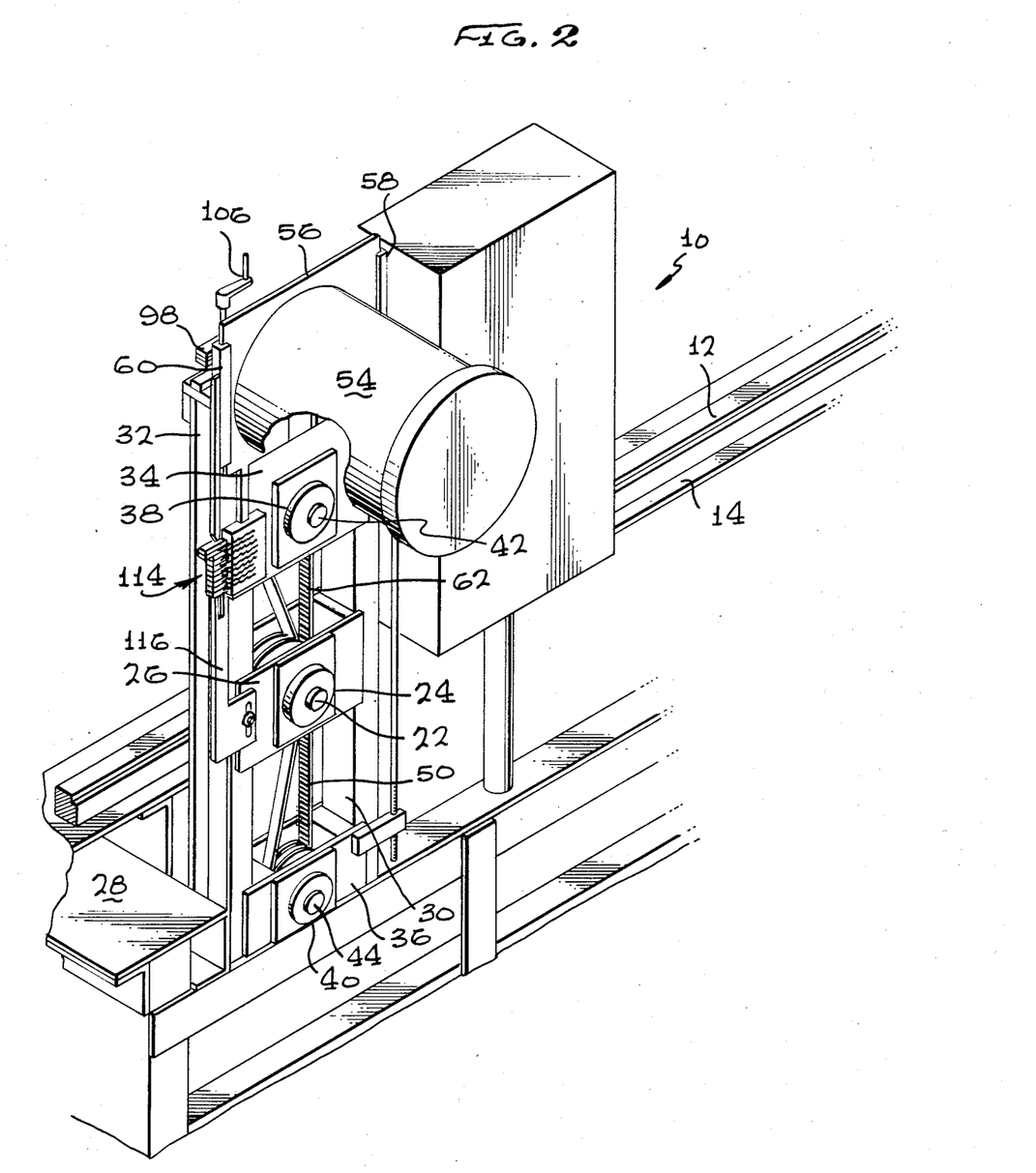
Figure 3:
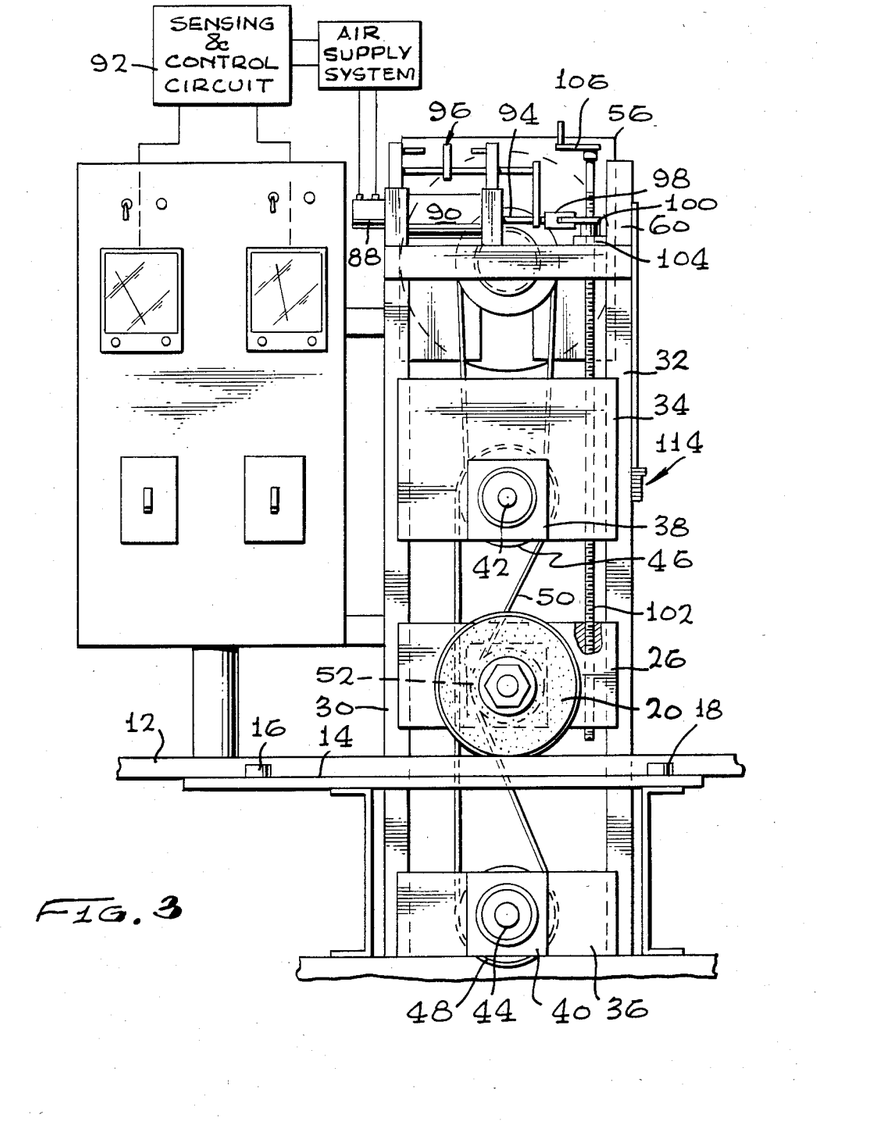
FIG. 3 is a front elevational view of the apparatus.

In its preferred embodiment, the apparatus for automatic maintenance of circumferential surface speed and work-bearing force in accordance with this invention is applied to an apparatus wherein a rotary finishing wheel is used for polishing long strips of already shaped wood molding. The apparatus is generally indicated at 10 in FIGS. 1, 2 and 3. The strip of molding 12 moves through the apparatus 10 in the left-to-right direction in FIGS. 1 and 3, but, as will be seen, the apparatus is capable of handling the molding in either direction, depending upon the direction of finishing wheel rotation and dust pickup. Molding 12 is guided into the apparatus 10 on guide plate 14 which serves as a bottom guide through the apparatus. Roller guides 16 and 18 provide lateral guidance to the molding as it passes along the guide plate. These and other lateral guides are shown in FIGS. 1 and 3.

Molding 12 is delivered from a shaper, molder, sticker or cutter which cuts the desired surface contour on the molding, but leaves cut marks. Apparatus 10 polishes the molding, preferably on the three visible sides, to remove the cut marks and to provide a finished surface. The finishing to provide a smooth cut-free surface is accomplished by grinding, polishing, buffing or whatever method can be successfully used on that particular material. For wood, an abrasive wheel is often employed for finishing. Rotary finishing wheel 20 rotates with shaft 22, which, in turn, is mounted for rotation in bearings in bearing housing 24, see FIGS. 3 and 4. Bearing housing 24, in turn, is mounted on carriage 26. The apparatus 10 has a main frame 28 which is a stationary structure. Ways 30 and 32 are fixed to the frame and extend transverse with respect to the guide path along which the molding is advanced. Carriage 26 is slidably mounted on the ways in a direction toward and away from the work. This motion controls the distance between shaft 22 and guide plate 14, to thus control the advance of the rotary finishing wheel 20 with respect to the molding 12. The manner in which the carriage is positioned is described below.

While the ways 30 and 32 are illustrated as being upright in this embodiment of the invention, it is clear from the mechanism, as the description thereof proceeds, that the forces which advance the finishing wheel 20 toward the work piece are independent of gravity. Therefore, the ways could be horizontal to present finishing wheels to the sides of the work piece, or could be upright from the bottom of the work piece to present a wheel to finish the bottom. Accordingly, other orientations of the ways are practical, and this example wherein the top of the work piece is finished by a polishing wheel carried on vertical ways is merely an example.

Mounting plates 34 and 36 are secured to the ways and respectively carry bearing housings 38 and 40. The bearing housings respectively carry transmission shaft 42 and idler shaft 44 rotatable within the bearings. Transmission pulley 46 and idler pulley 48 are fixed on the shafts, and toothed belt 50 engages around the pulleys. The belt also engages on the wheel shaft pulley 52 so that rotary abrasive wheel 20 is driven when transmission shaft 42 is driven.

Figures 5, 6, 8:
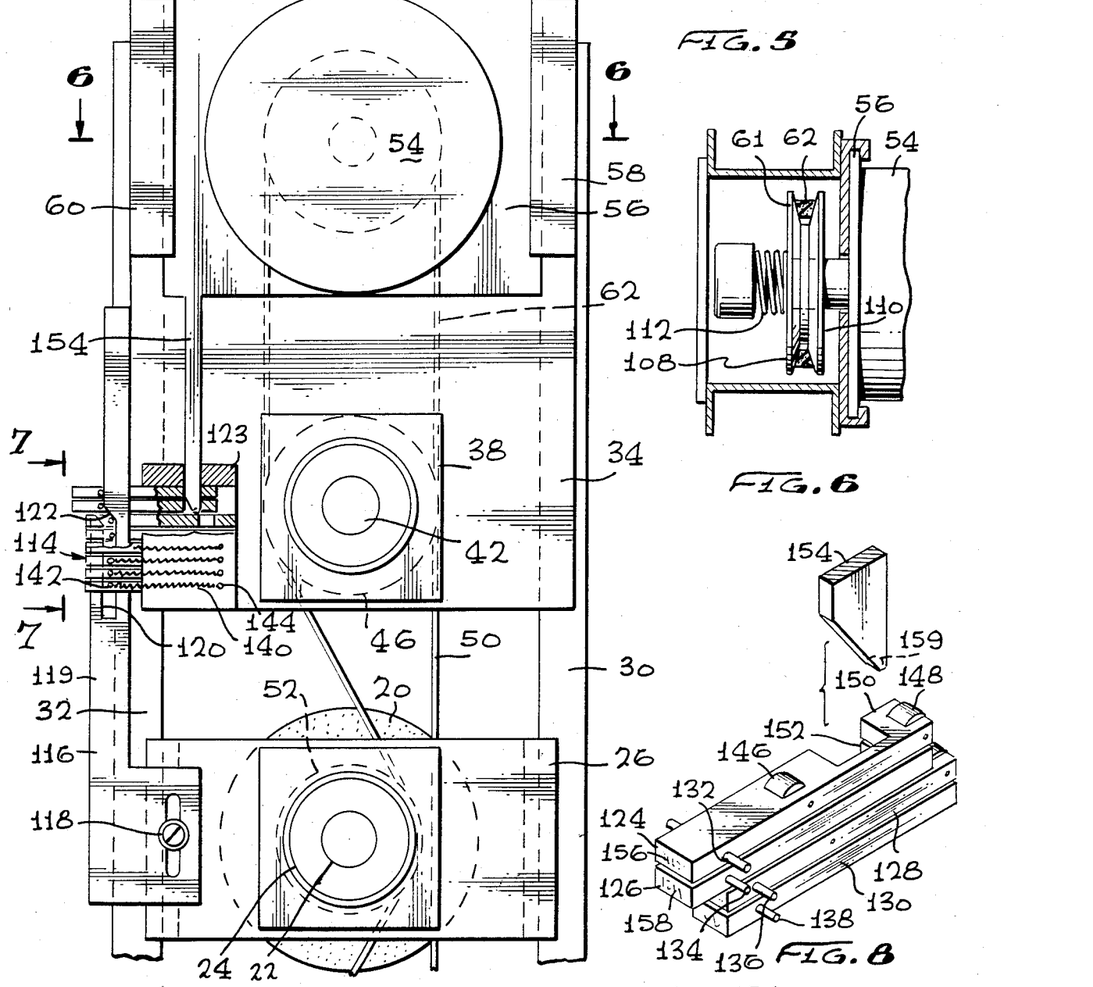
FIG. 5 is an enlarged rear view of the upper portion of the apparatus, with parts broken away and parts taken in section.
FIG. 6 is a plan view as seen generally along the line 6—6 of FIG. 5.
FIG. 8 is an isometric view of a portion of the speed control mechanism.

Electric motor 54 is the drive motor for wheel 20. Motor 54 is carried on motor-mounting plate 56 which is slidable in upright guides 58 and 60. Motor pulley 61, see FIG. 6, is mounted on the motor shaft and drives V-belt 62. Belt pulley 64 is fixed to shaft 42 so that, when the motor is rotating, belt 62 drives shaft 42 and belt 50 drives finishing wheel 20. For the moment considering motor mounting plate 56 stationary within its guides 58 and 60, it is seen that carriage 26 can move up and down on its ways and the rotary abrasive wheel will still be driven by belt 50. This double-belt drive is provided so that if two polishing wheels are provided, one above and below the molding 12, they can each separately move toward and away from the work piece independently of the position of the motor or the idler shafts. In this way, the belt 50 can drive one or more polishing wheel shafts while the belt 62 can be associated with a variable speed drive so that the two systems are substantially independent. However, it is clear that if there was no need to drive two finishing wheels, a simpler drive structure could be employed. In the simpler drive structure, the pulley 64 would be fixed on shaft 22 and the belt 62 would engage around pulleys 61 and 64. With this system, the finishing wheel could be advanced with respect to the work, with advance of the motor on its carrier plate 56. However, the spacing between those two shafts would be controlled to maintain substantially constant speed for the finishing wheel, as is described below.

Control of the distance of the rotary finishing wheel 20 with respect to the molding 12 upon which it is acting is important in the control of the force by which the wheel engages the work to do its cutting. Maintenance of a substantially constant work-bearing force of the wheel on the molding together with substantially constant surface speed is required for optimum cutting conditions which, in turn, result in optimum throughput. Machine efficiency is high when work piece throughput is maintained. Wear on the rotary finishing wheel 20 reduces the motor load and motor current is, thus, employed as a signal by which reduced finishing wheel diameter due to wear is sensed.

As seen in FIG. 10, a voltage which is analog to the motor current is provided to voltage divider 66 which delivers an analog voltage through amplifier 68 to both a high set point comparator 70 and low set point comparator 72. In these comparators, the analog of motor current is compared to high and low set point references 74 and 76. The low set point reference is provided for those occasions when there is no work piece in front of the wheel. This occurs because of the discontinuity in feed of the molding 12. Molding 12 is supplied in long, but not infinite pieces and may not run end-to-end through the apparatus. Therefore, when there is no cutting load on the rotary finishing wheel 20 due to no work piece moving past the finishing wheel, a wheel wear signal is not desired. Comparator 72 has an output when the motor current is above the low set point reference, and the output from the comparator goes through relay driver 78 and relay 80 to relay 82.

Comparator 70 compares the voltage corresponding to the motor current to a signal from the high set point reference 74. As the motor current decreases due to wear on the rotary finishing wheel 20, the signal into the comparator 70 goes down until it reaches the signal provided by high set point reference 74. When the motor current signal comes down to that point, comparator 70 has an output to relay driver 84 which has an output through time delay 86 to relay 82. When signals are provided both from relay 80 and time delay 86, relay 82 is actuated. It acts as an AND gate. Time delay 86 is provided for those occasions when the wheel is properly set, a piece of molding is completed, and another one does not immediately follow or there is a knothole or soft spot in the wood. With the falling motor current, no adjustment is desired, and time delay 86 holds off adjustment until the current drops below that which turns off comparator 72. In this way, unloading of the wheel by non-provision of a work piece does not signal wheel adjustment.

When relay 82 is actuated, motor current is low indicating wheel wear. Relay 82 actuates solenoid actuated air valve 88 which, in turn, actuates air motor 90. Valve 88 is such that, with every received pulse, it reverses air motor 90, which is in the form of a double-acting air cylinder. The motor-load-sensing and control circuit is generally indicated at 92 in FIG. 10 and is also seen in FIG. 3. FIG. 3 shows the valve 88 directly connected to motor 90, which is a cylinder having a piston rod 94 extending therefrom. Stop mechanism 96 is connected to the piston rod and to the cylinder of the air motor to act as an adjustable stop for the piston in each direction. Pawl carrier 98 is connected to the outer end of the piston rod and a pawl thereon engages ratchet wheel 100 on lead screw 102. Lead screw 102 rests on thrust bearing 104 and is threaded into a nut secured to carriage 26. Thus, rotation of the lead screw causes advance of carriage 26 and, thus, causes the rotary polishing wheel 20 to move toward its work piece. When wear of the rotary finishing wheel leads to decreased motor current and this motor current goes below the high set point, a series of pulses results in air motor 90 causing a series of incremental rotations of lead screw 102 so as to advance wheel 20 into more forceful engagement with the work piece until the motor current returns to the predetermined level. Thus, the motor load is maintained above a minimum value when a molding work piece is present. Hand crank 106 permits manual adjustment during setup.

Wear of the rotary finishing wheel 20 has another effect which reduces the throughput capability of the apparatus, if compensation is not made. The reduction in wheel diameter reduces the surface speed of the wheel if compensation is not made therefor and if the wheel shaft rotational speed is not increased. An example of a particular surface speed is 2,200 feet per minute, depending upon the type of finishing wheel, the molding material being cut, and the desired finish. As the rotary finishing wheel 20 wears, it can wear down to half diameter, to result in a surface speed as low as 1,100 feet per minute. In order to maintain reasonably constant surface speed of the finishing wheel through the reasonable wear life of the abrasive wheel, a variable speed drive is provided which operates by virtue of the force exerted by the motor on the pulley belt 62 via the motor pulley 61, all during the motor-running condition.

FIG. 6 shows that motor pulley 61 is made of left and right flanges 108 and 110 which cooperate together to act upon the belt 62. Flange 110 is fixed to the motor shaft, while flange 108 is splined thereto so that it rotates therewith but is axially movable thereon. Compression spring 112 acts between a cap on the end of the motor shaft and left flange 108 to urge left flange 108 in the rightward direction toward the right flange. This is an example of one kind of variable speed pulley. Other types could be employed. The lower belt pulley 64 is fixed in position and has a fixed V-groove therein having a fixed pitch diameter. Compression spring 112 urges left flange 108 to the right to maximize the pitch diameter of the two pulley flanges acting on belt 62. The force of the motor on the tensioned belt 62 urges the motor to advance in the forward direction toward the idler shaft 62 which carries the fixed pulley, thus permitting motor adjustment.

When the motor 54 is in its highest position, the effective pitch diameter of pulley 61 is at its smallest value. As the motor is lowered, the pitch diameter increases and the flanges are thrust together. V-belt 62 and the flanges 108 and 110 of motor pulley 61 are configured for a one-to-two ratio change in pitch diameter. Since motor pulley 61 is the driving pulley, an increase in pitch diameter causes an increase in rotative speed of wheel shaft 22. Thus, advancing the drive motor 54 by means of its mounting plate 56 causes an increase in rotative speed of wheel shaft 22. It will be appreciated that the same speed control would operate when an idler system is not used, but the drive belt 62 engages directly upon a driven pulley mounted upon the finishing wheel shaft. When the parts are properly sized and controlled, a substantially constant peripheral speed on the rotary finishing wheel 20 can be achieved over a two-to-one wear range with the parts illustrated and can be extended to an even larger range with different sizes of parts.

Figure 7:
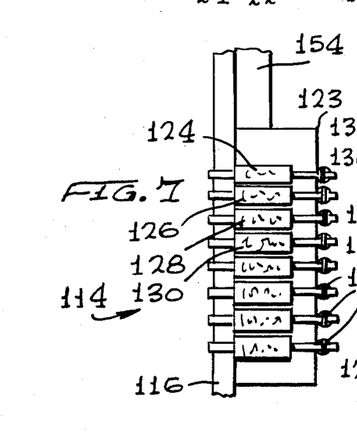
FIG. 7 is an enlarged side-elevational view, as seen generally along the line 7—7 of FIG. 5, with parts broken away.
Figure 9:
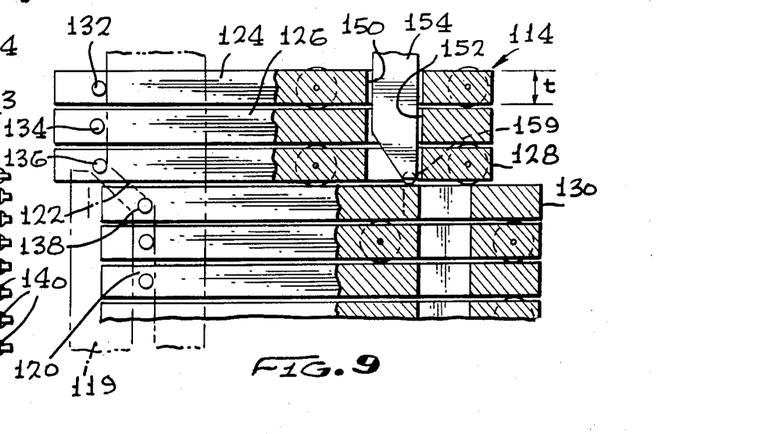
FIG. 9 is an enlarged side-elevational view of the sides of the fingers in the speed control mechanism, with parts broken away.

Control of the height of motor-mounting plate 56 is accomplished by controller 114 which is generally seen in FIG. 2 and is seen in more detail in FIGS. 5, 7, 8 and 9. Controller 114 is a mechanical controller which receives its signal from the position of the wheel and permits the motor-mounting plate to advance toward idler shaft 42. Signal cam 116 is adjustably secured on carriage 26 by means of clamp screw 118 engaging through a slot in the signal cam. The finger 119 of the signal cam carries cam slot 120 therein. Cam slot 120 includes cam shoulder 122 which is angularly outwardly directed with respect to the length of the finger. As is seen in FIG. 7, signal cam 116 extends upward behind slide box 123 which, in turn, is secured to stationary mounting plate 34. Slide box 123 has a rectangular opening therethrough in which lies a plurality of stop fingers. In the preferred embodiment illustrated in FIGS. 2, 5, 7 and 9, there are eight stop fingers. The top four stop fingers are indicated at 124, 126, 128 and 130. The remaining stop fingers are of identical construction. Each of the stop fingers has a cam follower pin therein, with the top four cam follower pins indicated at 132, 134, 136 and 138. As is seen in FIGS. 5 and 9, the cam follower pins are located in cam slot 120, with cam follower pins 132, 134 and 136 above cam shoulder 122, and with cam follower pin 138 below cam shoulder 122. Signal cam 116 thus controls the lateral position of the stop fingers within the slide box. Tension springs urge the stop fingers to the right. Tension spring 140 is illustrated with respect to the bottom stop finger and is shown as mounting on spring hook 142 on the finger and spring hook 144 on slide box 123.

FIG. 8 illustrates the top four stop fingers in the position shown in FIG. 5. This position is with the top two stop fingers to the left and the remaining lower ones to the right. Lateral sliding of the stop fingers is enhanced by anti-friction devices associated therewith, such as rollers 146 and 148 embedded in the stop fingers. FIG. 8 also illustrates that the stop fingers have rectangular gate openings therein. Gate openings 150 and 152 are illustrated with respect to stop fingers 124 and 126. As is seen in FIG. 5, all of the stop fingers have a gate opening therein. Support post 154 reaches down from motor-mounting plate 56 and is the only support which controls the extent of forward motion of the motor-mounting plate. As is seen in FIG. 5, support post 154 extends down through an opening in the top of slide box 123 and is in line with the gate openings in the stop fingers when the stop fingers are in the left position, but are out of alignment when the stop fingers are in the right position. Thus, as each stop finger moves to its left position where its gate opening is in line with support post 154, the motor-mounting plate and the motor mounted thereon may move forward one increment equal to the thickness of the stop finger. Belt tension supplies the force which advances the motor. When the geometry of the system is known, including motor speed and pulley diameter, the rotative speed of wheel shaft 22 is known for each stop finger. When the original rotary finishing wheel diameter is known, the surface speed of the wheel is also known for each stop finger. Suitable indicia can be positioned on the outer end of each stop finger to indicate the corresponding speed. Indicia 156 and 158 are indicated with respect to the top two stop fingers 124 and 126, and similar indicia is applied to the other stop fingers, as shown in FIG. 7. An anti-friction ball 159 is embedded in the end of support post 154.

As the finishing wheel wears and carriage 26 advances in accordance with motor current signals, the work-bearing force is maintained. As the carriage 26 advances, controller 114 advances the position of motor 54 which, by virtue of the variable nature of motor pulley 61, causes an increase in rotative speed, so that surface speed of the wheel is maintained. Thus, the apparatus provides automatic maintenance of surface speed and work-bearing force through the wear life of the rotary tool.

Usually there are three sides of a molding 12 which will be exposed, with one side against a supporting surface to which the molding is secured. The apparatus thus described can readily move the molding across its guide plate with the surface which does not require finishing moving against the guide plate. The rotary finishing wheel 20 acts to finish the side away from the guide plate. Additional wheels can be provided for finishing the other two surfaces. Should the opposite side from finishing wheel 20 also require finishing, another carriage could be mounted on rails 30 and 32, carrying the second finishing wheel below the work piece. This second carriage would be advanced by the same screw 102, with a portion of the screw being oppositely threaded so both carriages would advance toward the work piece at the same time and for the same distance. The second wheel would be driven by a pulley in engagement with belt 50.

Should the sides of the work piece require finishing, in the generally horizontal plane across guide plate 14, as seen in FIGS. 1 and 2, the entire structure could be duplicated with horizontal rails 30 and 32 guiding horizontally moving carriages in the manner described above. Thus, all four sides of the work piece could be quickly, economically and smoothly finished in this apparatus which automatically maintains the surface speed and work-bearing force of the finishing wheel on the work to provide optimum finishing conditions. It is clear that this apparatus is capable of adjusting the rotary speed of the cutting wheel through a drive mechanism which is economic to build and maintain. Therefore, the apparatus is useful in many other applications, where the change in rotative speed is required when the rotary cutting tool is moved. Therefore, the apparatus is useful for a wide number of applications other than the exemplary apparatus described in this specification and shown in the drawings.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An apparatus for automatic maintenance of surface speed of a rotary tool which acts on a work piece advancing therepast comprising:
   guide means defining a path for the advance of the work piece;
   support means for mounting a rotary tool shaft for supporting the rotary tool with respect to said path;
   a drive motor connected to drive the rotary tool;
   means for sensing the size of the rotary tool; and
   variable speed means connected between said motor and said rotary tool shaft for driving said rotary tool shaft, said variable speed means being a driving shaft connected to be driven by said drive motor and a driven shaft connected to drive said rotary tool shaft, a V-belt pulley fixed to one of said drive and driven shafts and a variable V-belt pulley connected to the other of said drive and driven shafts, said variable pulley having spaced V-belt flanges urged toward each other, a V-belt engaged on both of said pulleys so that said drive shaft drives said driven shaft at a speed ratio governed by the effective pitch diameter of said V-belt on said variable V-belt pulley, V-belt tension of said V-belt urging said drive and said driven shafts toward each other, one of said drive and driven shafts being movably mounted so that it can move toward the other of said drive and driven shafts, a stop post and a plurality of stacked stop fingers connected between said drive and driven shafts to maintain the spacing therebetween, said means for sensing the size of the rotary tool being connected to control said stop fingers so that said stop fingers are moved away from said stop post in order to permit said drive and driven shafts to move closer to each other to change the effective pitch diameter of said V-belt on said variable V-belt pulley to change the speed ratio between said driving and driven shafts so that said variable speed means for driving said rotary tool shaft automatically drives said rotary tool shaft at a greater rotative speed as the rotary tool wears in order to maintain automatically substantially constant surface speed of the rotary tool.

2. The apparatus of claim 1 wherein said motor is connected to said rotary tool-carrying shaft by means of said variable speed drive and said variable speed drive is adjusted by movement of said rotary tool-carrying shaft toward said path.

3. The apparatus of claim 2 wherein a bearing carries said rotary tool-carrying shaft and a signal cam is connected to said bearing, said signal cam signaling said variable speed drive to adjust rotative speed of said tool-carrying shaft.

4. The apparatus of claim 3 wherein there is a plurality of stop fingers and said signal cam controls said stop fingers, said stop fingers being movable from a first position wherein they maintain the position of said variable speed drive to a second position wherein they cause adjustment of said variable speed drive, said signal cam successively controlling the movement of said stop fingers from said first position to said second position.

5. The apparatus of claim 4 wherein said variable speed drive is a V-belt drive with a variable pitch V-belt pulley driven by said motor, the position of said motor being controlled by said stop fingers so that each stop finger corresponds to a particular pitch diameter and rotative speed of said rotary tool-carrying shaft.

6. An apparatus for the automatic maintenance of work-bearing force of a rotary wheel which acts on a work piece advancing therepast and for the control of the speed of the rotary wheel comprising:
   A frame;
   a driven shaft;
   a driving shaft, an electric motor connected to said driving shaft to drive said driving shaft;
   means for mounting said driving shaft with respect to said frame and with respect to said driven shaft so that said shafts may move laterally toward each other and with one of said shaft moving with respect to said frame and the other of said shafts being mounted on said frame;
   a driven pulley mounted on said driven shaft and a driving pulley mounted on said driving shaft, both of said pulleys being V-belt pulleys having facing flanges defining a belt groove therebetween, at least one of said pulleys being arranged so that said flanges thereof can move toward each other to vary the effective pitch diameter of said pulley;

means for urging said movable flanges toward each other;

a belt engaged around both of said pulleys so that as said means urges said flanges toward each other, said belt is tensioned and said shafts are urged toward each other;

a wheel-carrying shaft;

mounting means on said frame for movably mounting said wheel-carrying shaft with respect to the work piece advancing therepast so as to control engagement of a wheel on said wheel-carrying shaft with respect to the work piece, a drive belt connecting said driven shaft with said wheel-carrying shaft so that rotation of said motor rotates said wheel-carrying shaft;

sensing means connected to said motor to sense motor current for indicating the work-bearing force of the wheel against a work piece, said sensing means being connected to control the position of said wheel-carrying shaft with respect to the work piece advancing therepast so that upon reduction of motor current indicating wear of the wheel, said wheel-carrying shaft is advanced toward the work piece;

means interconnecting said wheel-carrying shaft and said driven shaft so that as said wheel-carrying shaft is advanced toward the work piece to control work-bearing force of the rotary wheel, said driven shaft is moved with respect to said driving shaft to control the rotational speed of said driven shaft and consequently the rotational speed of said wheel-carrying shaft and the wheel carried thereon to maintain the peripheral speed of the wheel carried on said wheel-carrying shaft.

7. The apparatus of claim 6 wherein there is means for restraining said shafts so that said shafts are restrained from moving toward each other under belt tension.

8. The apparatus of claim 7 wherein said means for restraining includes a plurality of movable stop fingers movable from a first position wherein each of said stop fingers individually restrains movement of said shafts toward each other to a position where each of said fingers individually permits advance of said shafts toward each other.

9. The apparatus of claim 8 wherein there is a support post connected to one of said shafts, said support post being supported by said fingers when said fingers are in the first position so that movement of each of said fingers from its first to its second position permits advance of said shafts with respect to each other by an amount equal to the thickness of said finger.

10. The apparatus of claim 9 wherein each of said fingers is resiliently urged into its first position and a cam is positioned adjacent said fingers, said cam successively engaging said fingers to successively move said fingers from said first position to said second position.

11. An apparatus for the automatic maintenance of work-bearing force of a rotary wheel which acts on a work piece advancing therepast and the automatic maintenance of surface speed of the rotary wheel with respect to the work piece comprising:

a frame;

a carriage movably mounted on said frame;

means on said frame for guiding a work piece along a path;

means on said frame for supporting a rotary wheel adjacent said path so that said rotary wheel can act upon the work piece, said rotary wheel support means being movable on said frame toward said path, said means for supporting said rotary wheel comprising a screw interengaged between said rotary wheel support means and said frame, means to rotate said screw being connected to said screw so that rotation of said screw moves said rotary wheel with respect to said path;

an electric motor, said electric motor being connected to said rotary wheel through means for driving said rotary wheel;

motor current sensing means for sensing the load of said wheel with respect to the work piece, said means for sensing the load being connected to said screw so that said wheel is moved toward the work piece when the current load goes below a predetermined value to maintain work-bearing force substantially constant;

said means for driving said rotary wheel including a variable speed V-belt drive including a variable pulley rotatable on an axis and having its pulley flanges movable with respect to each other along said axis, said variable speed pulley being mounted on said carriage which is movable with respect to said frame so that said axis can move to vary the effective pitch diameter of said variable pulley;

a cam secured to said means for supporting the rotary wheel so that said cam is an indication of wheel radius, said cam being connected to control the position of said carriage on said frame so as to control the speed of said variable speed drive to control the rotative speed of said wheel so as to maintain the surface speed of said wheel substantially constant with respect to the work.

12. The apparatus of claim 11 wherein there is a post mounted on said carriage to control the position of said carriage with respect to said frame, a plurality of stop fingers mounted on said frame, said stop fingers being positioned to sequentially obstruct the passage of said post, said cam being connected to said stop fingers to successively move said stop fingers away from obstruction of said post so that said cam controls said stop fingers and said stop fingers control the position of said carriage with respect to said frame.

13. The apparatus of claim 12 wherein said electric motor and said variable V-belt pulley mounted to rotate on said axis are both mounted on said carriage so that said carriage moves closer to said path to maintain the peripheral speed of said rotary wheel substantially constant as said rotary wheel wears and is moved by said screw toward said path.

14. The apparatus of claim 11 wherein said wheel is mounted upon a shaft which is rotatable in a bearing, said bearing being mounted on a bearing support which is movable toward said path so that said wheel can be moved toward said path.

15. The apparatus of claim 14 wherein said bearing is mounted on a carriage which is slidably mounted on a way so that said shaft and a wheel carried thereon can be moved toward said path.

16. The apparatus of claim 11 wherein said motor current sensing means has a preselected high reference point and a preselected low reference point and a signal corresponding to motor current is compared in a comparator to both said high reference point and said low reference point, said comparator producing an output when the signal corresponding to motor current is below the high reference point and above the low refer- -ence point so that no adjustment signal is produced when there is no work piece engaged by said wheel.

17. The apparatus of claim 16 wherein said wheel is mounted upon a shaft which is rotatable in a bearing, said bearing being mounted on a bearing support which is movable toward said path so that said wheel can be moved toward said path.

18. The apparatus of claim 17 wherein said bearing is mounted on a carriage which is slidably mounted on a way so that said shaft and a wheel carried thereon can be moved toward said path.

* * * * *